United States Patent [19]

Bacher

[11] 4,266,636
[45] May 12, 1981

[54] CROWN-TYPE CALIPER BRAKE

[75] Inventor: Micher Bacher, Garges-les-Gonesse, France

[73] Assignee: Société Anonyme Francaise du Ferodo, France

[21] Appl. No.: 8,698

[22] Filed: Feb. 1, 1979

[30] Foreign Application Priority Data

Feb. 3, 1978 [FR] France ............................. 78 03070

[51] Int. Cl.³ ............................................. F16D 53/00
[52] U.S. Cl. ................................................ 188/76; 192/73
[58] Field of Search ................... 188/76, 73.3, 73.5, 188/73.6, 365; 192/73

[56] References Cited

U.S. PATENT DOCUMENTS

| | | | |
|---|---|---|---|
| 3,052,327 | 9/1962 | Yazell, Jr. et al. | 188/76 |
| 3,256,959 | 6/1966 | Eggstein | 188/73.6 |
| 3,291,262 | 12/1966 | Rosanowski et al. | 188/73.3 |
| 3,357,525 | 12/1967 | Francois | 188/76 |
| 3,370,679 | 2/1968 | Holmes, Jr. | 188/73.3 |
| 3,586,135 | 6/1971 | Ostwald | 188/76 |
| 3,705,641 | 12/1972 | Brooks et al. | 188/73.3 |
| 3,933,227 | 1/1976 | de Gennes | 188/76 |
| 3,972,393 | 8/1976 | Courbet et al. | 188/73.5 X |
| 3,974,895 | 8/1976 | Murphy | 192/73 X |
| 3,997,034 | 12/1976 | Kellogg | 188/73.3 |
| 4,084,666 | 4/1978 | Karasudani | 188/73.3 |
| 4,151,899 | 5/1979 | Wright | 188/73.3 |

FOREIGN PATENT DOCUMENTS

| | | | |
|---|---|---|---|
| 1264891 | 3/1968 | Fed. Rep. of Germany | 188/73.6 |
| 2252240 | 10/1972 | Fed. Rep. of Germany | 188/73.3 |
| 1356456 | 2/1964 | France | 188/76 |
| 1526884 | 10/1978 | United Kingdom | 188/73.3 |

Primary Examiner—George E. A. Halvosa
Attorney, Agent, or Firm—Charles E. Brown

[57] ABSTRACT

A crown-type caliper brake is disclosed comprising a cylindrical braking member and a C-shaped caliper member. The caliper member is mounted for sliding movement on the leg member of a fixed support of the brake. To this end a lobe on the caliper member has an opening which is received on the leg member extending parallel to the gripping axis of the brake along the direction of which the brake pads are applied by the caliper member against the braking member. The leg member is preferably of rectangular contour with its sides parallel to the axial gripping plane of the brake in sliding contact with corresponding surfaces in the lobe. Play between the other sides of the leg member and corresponding surfaces in the lobe is taken up by a leaf spring. Pins or studs extending between the limbs of the caliper member, or the intermediate portion of the caliper member itself, block the brake pads against circumferential displacement.

21 Claims, 15 Drawing Figures

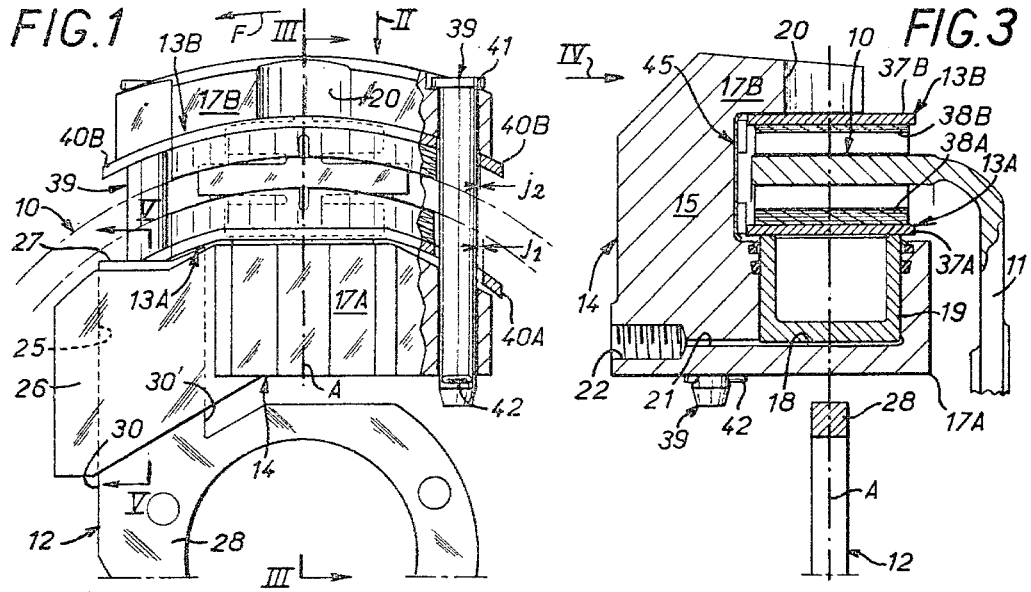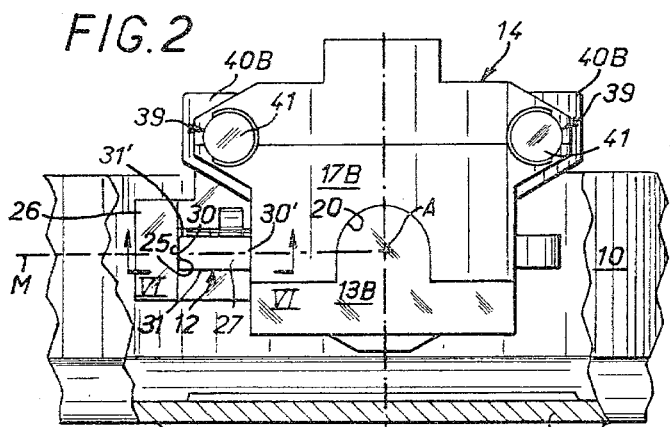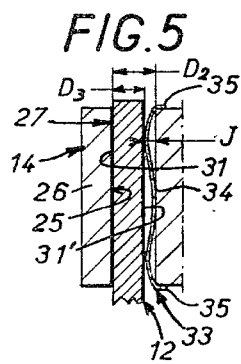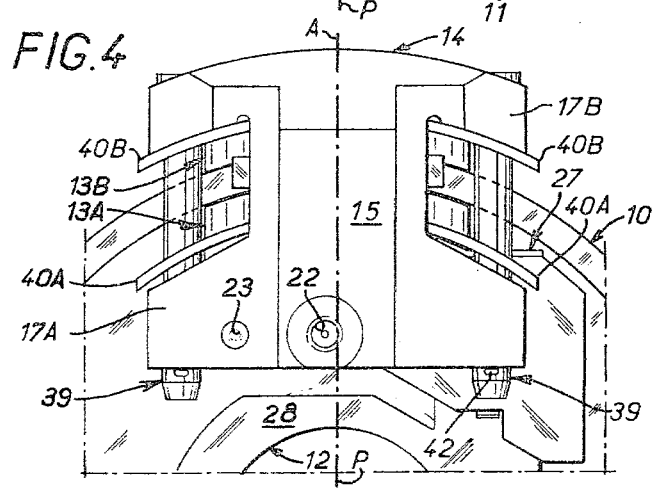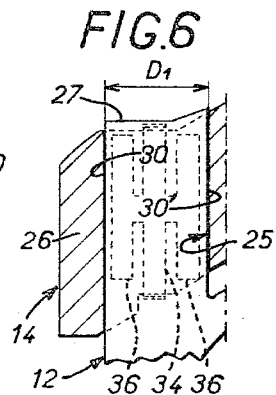

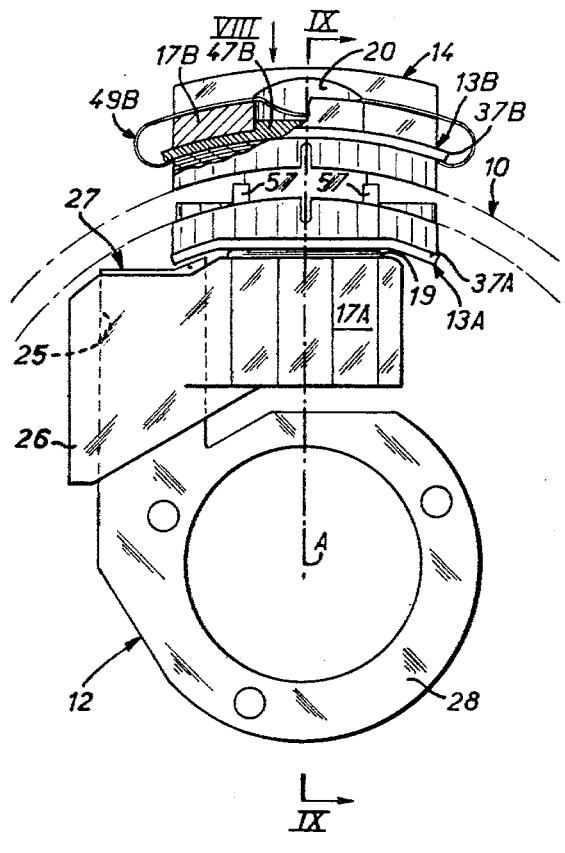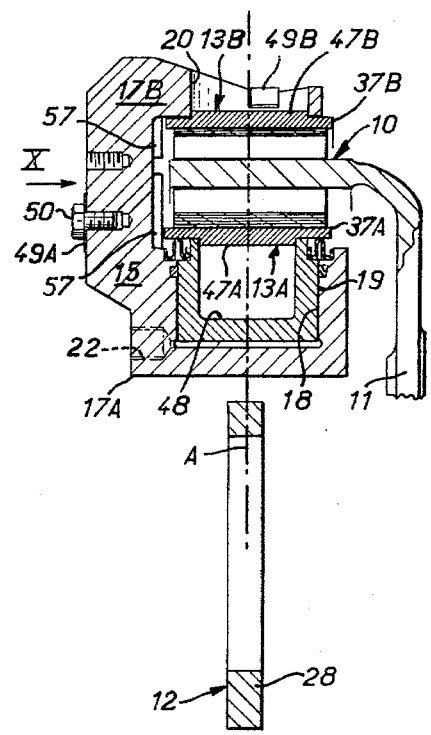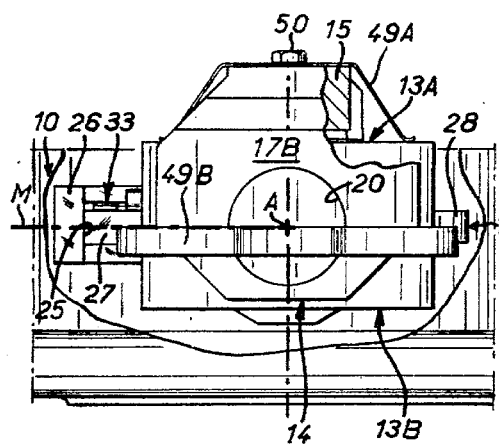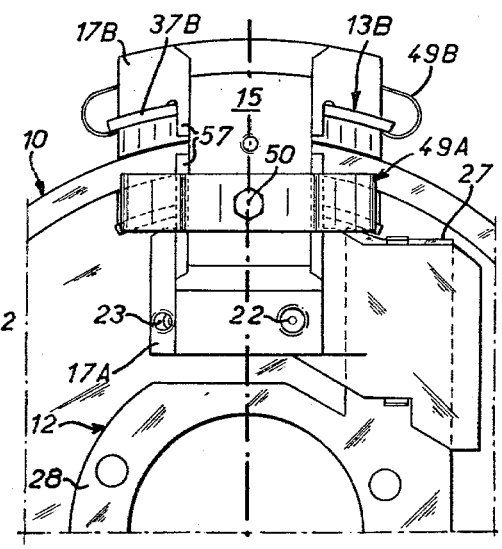

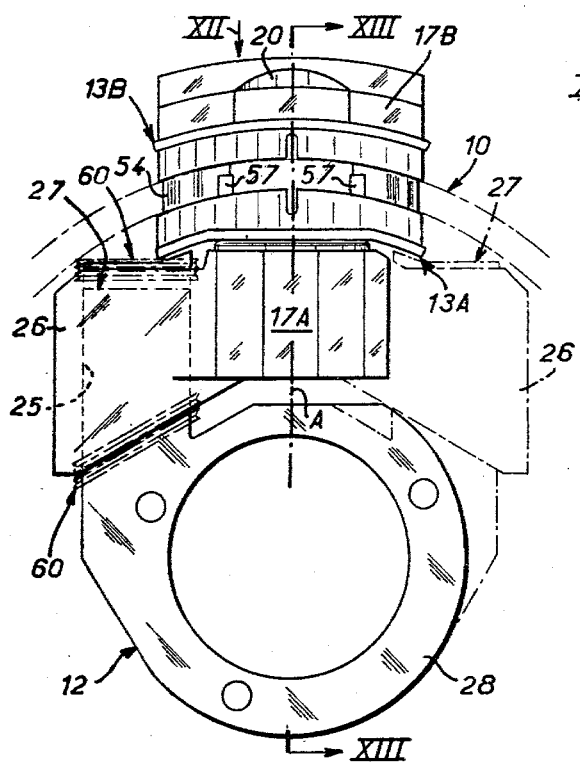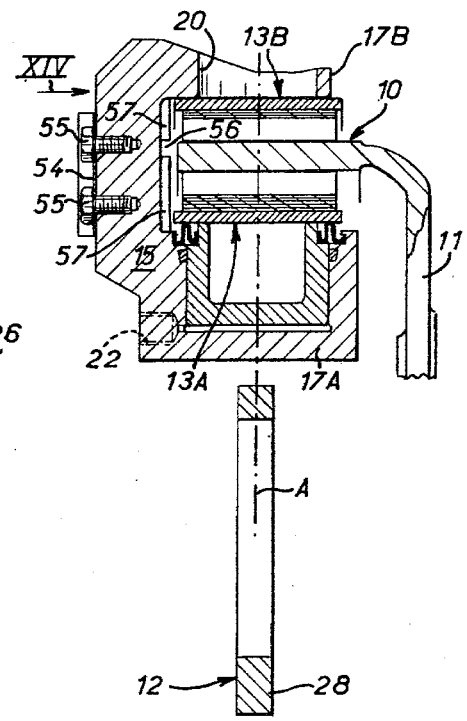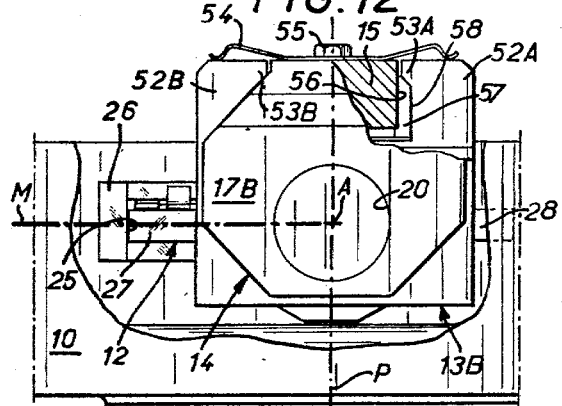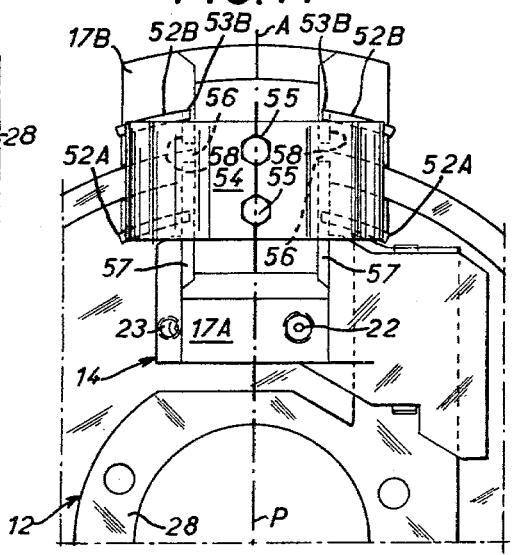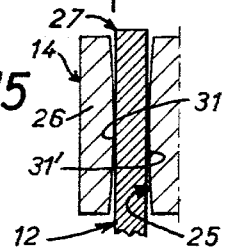

CROWN-TYPE CALIPER BRAKE

The present invention relates to caliper brakes having an axially elongate cylindrical braking member, also known as crown-type caliper brakes.

Such a brake also comprises a fixed support adapted to be fixed to any support member, for example the axle tube of a wheel to be braked, the cylindrical braking member being fast with the axle itself. Two brake pads are respectively disposed inside and outside of the cylindrical breaking member, and operating means are adapted to apply the brake pads against the cylindrical braking member along a generally radial direction relative to the braking member, referred to hereinafter as the gripping axis, extending through the central area of each of the brake pads.

The present invention is directed more particularly to the case in which the operating means comprise a generally C-shaped caliper member which is mounted for radial movement with respect to the cylindrical breaking member and radially straddles the brake pads and the cylindrical braking member. The caliper member comprises a first arm or limb cooperable with a first brake pad and a second arm or limb cooperable with a second brake pad, and an intermediate portion interconnecting the arms or limbs.

One problem to be resolved in the construction of such brakes lies in the interconnection to be provided between the caliper member and the fixed support in order to ensure both satisfactory holding and guiding of the caliper member.

According to one arrangement as disclosed, for instance, in U.S. Pat. No. 2,783,858 or in French Pat. No. 1,463,308 the caliper member is pivotally mounted in cantilever fashion on a cylindrical part of a fixed support acting as a journal and parallel to the axis of the cylindrical braking member. In such an arrangement in which the fixed support is simplified to no more than the journal itself on which the caliper member is pivotally mounted, the caliper member is not guided strictly radially, but on the contrary the caliper member is displaced along an arcuate path relative to the journal whereby the brake pads wear irregularly.

In such arrangements as described particularly in U.S. Pat. Nos. 2,563,392 and 3,052,327 the fixed support has two radial arms between which the caliper member is slidingly mounted so that accurate radial guiding of the caliper member is ensured. But in this case the guiding surfaces for the caliper member are relatively large and relatively remote from each other.

It is therefore difficult in practice to ensure suitable lubrication which might lead to unsatisfactory sliding between the caliper member and the guiding surfaces during braking, thereby interfering with the return of the brake pads to their rest position after braking and therefore prolonging a residual braking torque producing untimely wear of the brake pads.

This drawback is all the more troublesome since, in certain cases the brake pads being out of contact with the fixed support and therefore blocked circumferentially by the caliper member, the caliper member must not only withstand the radial gripping force which the force-applying means carried thereon develops, but also must transmit to the fixed support the circumferential braking force transmitted to the brake pads by the cylindrical braking member.

This force is not equal for each of the brake pads because of the difference between the radii along which they are in contact with the cylindrical braking member; the caliper member is then subjected to a rocking couple which can only accentuate the tendency of the caliper member to jam against the guiding surfaces.

A general object of the present invention is the provision of an arrangement providing radial guiding of the caliper member while preventing such jamming or binding.

According to the invention there is provided a crown-type caliper brake comprising a fixed support, a rotatable axially elongate cylindrical braking member, two brake pads respectively disposed inside and outside the cylindrical braking member, a generally C-shaped caliper member mounted for radial movement relative to the cylindrical braking member and radially straddling the brake pads and the cylindrical braking member, the caliper member comprising a lobe having an opening through which a part on the fixed support is received, and a first limb provided with a force applying means for urging a first brake pad against the cylindrical braking member and a second limb for urging the second brake pad against the cylindrical braking member so that through the action of the force-applying means and transmission through the caliper member, the brake pads are applied together against the cylindrical braking member, along a generally radial gripping axis passing through the central areas of the brake pads, the brake being characterized by part of the fixed support comprising a leg member which extends generally parallel to the gripping axis, the leg member being receiving in an opening in a lobe on the caliper member for slidably mounting the caliper member on the said leg member.

According to a first embodiment, there is provided a single leg member so that as in U.S. Pat. No. 2,783,858 or French Pat. No. 1,463,308 the fixed support for the caliper member effectively simplifies down to one such leg member. But in this case, however, it is not a journal on which the caliper member is pivotally mounted but a leg member on which the caliper member is slidably mounted.

According to an alternative embodiment two leg members may be provided one on each side of the axial plane of the brake passing through the gripping axis, or axial gripping plane.

Still, in both embodiments, accurate radial guiding of the caliper member is ensured and, if desired, may easily be satisfactorily lubricated, for example, with a sealed or "protected" type of lubricating arrangement in which the lubricant is protected by a sealing bellows from the ingress of dust as well as untimely oxidation.

With their compact configuration the leg member or members of the invention lend themselves to easy accommodation of bellows therearound at the opening in the corresponding lobe or lobes of the caliper member.

Features and advantages of the invention will become apparent from the following description, given by way of example, with reference to the accompanying schematic drawings, in which:

FIG. 1 is a partly broken away fragmentary view in elevation of a brake embodying the present invention, with cylindrical braking member removed for the sake of clarity;

FIG. 2 is a plan view, partly broken away, of the brake in the direction of arrow II in FIG. 1;

FIG. 3 is an axial sectional view of the brake embodying the invention taken along the line III—III in FIG. 1;

FIG. 4 is another elevational view taken in the direction of arrow IV in FIG. 3;

FIGS. 5 and 6 are fragmentary sectional views taken along line V—V in FIG. 1 and line VI—VI in FIG. 2, respectively;

FIGS. 7-10 are views similar to FIGS. 1-4, respectively according to a first alternative embodiment;

FIGS. 11-14 are also views similar to those of FIGS. 1-4, respectively, but for another alternative embodiment; and FIG. 15 is a fragmentary sectional view similar to FIG. 5 for a modified embodiment.

In the drawings is shown a crown-type caliper brake, i.e., a caliper brake in which the rotatable braking member 10 is of generally axially elongate cylindrical configuration. The cylindrical braking member 10 is carried by a flange 11 which in turn may be made fast with the axle (not shown) to be braked. Such a brake may, for example, equip an automotive vehicle.

As is known per se the brake comprises a fixed support 12, two brake pads 13A, 13B disposed respectively inside and outside the cylindrical braking member 10 for cooperation with the inner and outer surfaces of the braking member. The brake further comprises a caliper member or operating member 14 adapted to apply the brake pads 13A, 13B against the braking member 10 along a generally radial direction A, herein referred to as the gripping axis, passing through the central areas of the brake pads. The gripping axis A is represented in dash-dotted lines in FIGS. 1, 3 and 4 and by a mere cross in FIG. 2.

In practice, also as known per se, the caliper member 14 is of generally C-shaped configuration and extends radially of and straddles the cylindrical braking member 10 and the brake pads 13A, 13B. The caliper member 14 accordingly comprises a first arm or limb 17A which has a blind bore 18 forming a cylinder for a piston which in operation bears against the first brake pad 13A and a second arm or limb 17B having a notched end 20, as shown, which bears against the brake pad 13B. Behind the piston 19 the cylinder 18 communicates via a channel 21 to threaded port 22 which is adapted to be connected to a pressure source (not shown). A bleed port 23 may also be provided, FIG. 4.

The caliper member 14 is held and guided by means of a lobe 26 having means defining an opening or passage 25 which is received on a part 27 of the fixed support 12.

In accordance with the invention, part 27 of the fixed support constitutes a leg member which extends generally parallel to the gripping axis A and serves to mount the caliper member 14 for sliding movement. In the embodiment of FIGS. 1-6 there is only one leg member spaced from the axial plane P of the brake passing through the gripping axis A, which is referred to as the axial gripping plane. This axial gripping plane is represented by a dash-dotted line in FIGS. 1, 2 and 4.

The lobe 26 on the caliper member 14 forms a circumferential continuation of limb 17A thereon.

In the embodiment of FIGS. 1-6, the leg member 27 is integrally formed with an annular collar 28 adapted to be fixed, e.g. by screws, to some fixed member on the vehicle, for example, the axle tube for the wheel to be equipped with the brake.

The leg member 27 lies generally in the plane of the annular collar 28 thereby constituting a highly simplified fixed support 12.

In the illustrated embodiment the leg member 27 has a quadrilateral cross section, rectangular as shown, including two narrow sides 30, 30' parallel to the axial gripping plane P and two wide sides 31, 31' perpendicular to the axial gripping plane P. In conjunction therewith the passage or opening 25 through the lobe 26 of the caliper member 14 is of quadrilateral contour. The caliper member 14 is fitted for sliding movement on the narrow sides 30, 30' of the leg member 27. The distance $D_1$ between the narrow sides of the channel 25 are also substantially equal to the distance between the narrow sides 30, 30' of the leg member 27, within the limits of assembly tolerances, FIG. 6.

On the other hand, for the two wide surfaces 31, 31' of the leg member 27 play J is provided between the caliper member 14 and the leg member 27, the distance $D_2$ between the corresponding surfaces of the passage or opening 25 in the caliper member being greater than the distance $D_3$ between the wide sides 31, 31' of the leg member 27, FIG. 5.

The play J is taken up by appropriate resilient means. In the embodiment of FIGS. 1-6 the resilient means comprise a leaf spring 33 inserted between the leg member 27 and the caliper member 14 in the passage or opening 25 in the caliper member. The leaf spring 33 comprises a central strip 34 and two bent-over portions 35 for hooking the leaf spring onto the caliper member 14, FIG. 5, and two side strips 36, FIG. 6, alternately bearing on the leg member 27 and the caliper member 14.

As is known per se, each brake pad 13A, 13B which comprises a support plate 37A, 37B and a friction lining 38A, 38B is attached to the support plate 37A, 37B, by, e.g. an adhesive.

The brake pads 13A, 13B are maintained circumferentially by at least a pin or stud 39 which extends from one of the limbs 17A and 17B of the caliper member 14 to the other, parallel to the axial gripping plane P so that the pin or stud 39 may bear the brake pads 13A, 13B.

In the illustrated embodiment of FIGS. 1-6 two such pins or studs 39 are provided, one on each side of the axial gripping plane P, and the support plates 37A, 37B of the brake pads 13A, 13B each have lugs 40A, 40B for engagement with the pins or studs 39.

Preferably, as shown, the pins or studs 39 are removable. They completely traverse the caliper member 14 with heads 41 on one of their ends which bear against the limb 17B of the caliper member and facilitate grasping; at their other ends protruding beyond the limb 17A of the caliper member 14 cotter pins 42 are inserted.

When pressurized fluid is conveyed to the cylinder 18, piston 19 urges brake pad 13A against the inside of the cylindrical braking member 10 and the caliper member 14 transmits a corresponding force to the brake pad 13B for applying it against the outside of the braking member 10 which is consequently clamped between the pads. Once the pressure is relaxed the braking member 10 is unclamped.

In the course of the application of the brake the caliper member 14 admits of radial displacement relative to the braking member 10 while it is guided by the leg member 27. Owing to the caliper member 14 being fitted for sliding movement along the narrow sides of the leg member 27 the latter resists rocking of the caliper member 14 around an axis parallel to the axis of the cylinder braking member 10. On the other hand, because of the play or clearance J between the leg member 27 and the caliper member 14 on the wide sides 31, 31' of the leg member 27 the caliper member 14 admits of rocking movement, if necessary, around an axis perpendicular to the axial gripping plane P and therefore perpendicular to the axis of the braking member 10, in order to accommodate any possible coning of the cylindrical braking member.

As it will be readily understood a suitable lubricant may be applied to the guiding surfaces between the caliper member and the leg member 27 and, for example, a protected lubricating arrangement provided. In this event two bellows, not shown in FIGS. 1–6, are disposed around the leg member 27 at the respective ends of the opening or passage 25 through the caliper member 14.

Under all conditions good radial guiding of the caliper member 14 is achieved.

Moreover, the lugs 40A, 40B on the brake pads 13A, 13B define clearance with the pins or studs 39.

If no special measures are taken, assuming the direction of rotation of the braking member 10 is as denoted by arrow F in FIG. 1, during braking the brake pads 13A, 13B are dragged by friction in the same direction F, then either circumferentially abut the pin or stud 39 to the left in FIG. 1, or are retained by the other, leading pin or stud 39 that is, to the right in FIG. 1.

Preferably however, there is a differenciation between the brake pads 13A, 13B in this respect. For example, as illustrated, the play $j_1$ of the brake pad 13A with respect to leading pin or stud 39 relative to the direction of rotation is greater than play $j_2$ of brake pad 13B. The arrangement is reversed with the lagging pin or stud 39. The play $j_1$ or $j_2$ is produced by merely making the corresponding holes oval. Accordingly during braking only brake pad 13A circumferentially abuts against lagging pin or stud 39, brake pad 13B being retained circumferentially by the leading pin or stud 39. Thus, each of the pins or studs 39 withstand an approximately equal part of the braking forces.

Preferably, as shown, potential displacements between the brake pads 13A, 13B and the pins or studs 39 which would generate noise may be prevented by subjecting the brake pads 13A, 13B to an axial force with a leaf spring 45 which bears against the intermediate portion 15 of the caliper member and maintains the brake pads 13A, 13B against the pins or studs 39.

In the foregoing description the braking forces are received by the pins or studs 39 and, since the pins or studs 39 are fixed to the caliper member 14, are transmitted to the caliper member and ultimately from the caliper member to the fixed support 12.

In the illustrated embodiments of FIGS. 7–14 the pins or studs 14 are eliminated and the braking forces are received directly by the caliper member 14.

In conformity with the embodiment of FIGS. 7–10, each brake pad 13A, 13B is blocked circumferentially against the limb 17A, 17B corresponding to the caliper member 14.

As illustrated the support plate 37A of brake pad 13A has a raised portion 47A which is fitted in an inner peripheral wall portion of the piston 19. Thus, in this case. the brake pad 13A is blocked circumferentially against the limb 17A of the caliper member 14 by the piston 19.

In conjunction therewith, the support plate 37B of the other brake pad 13B comprises a raised portion 47B which is fitted in the inner peripheral wall portion 20 of the limb 17B of the caliper member 14, which wall portion is preferably of closed contour.

A spring 49A which is fixed by a screw 50 to the intermediate portion 15 of the caliper member 14 axially urges the brake pad 13A, the ends of the spring 49A bearing on the brake pad. In conjunction therewith the brake pad 13B is urged by a spring 49B radially against the limb 17B of the caliper member 14, the spring 49B bearing along its midsection against the limb 17B and its ends under the support plate 37B of the brake pad 13B.

Protruding portions 57 on the lateral sides of the intermediate portion 15 of the caliper member 14 preclude any undesired rotation of the brake pads 13A, 13B about the gripping axis A.

The operation of the embodiment of FIGS. 7–10 is similar to that of the brake described with reference to FIGS. 1–6.

In accordance with the embodiment depicted in FIGS. 11–14 each brake pad 13A, 13B is blocked circumferentially against the intermediate portion 15 of the caliper member 14.

To this end the support plate 37A, 37B of each brake pad 13A, 13B comprises lugs 52A, 52B which are provided with projecting portions 53A, 53B directed at each other. The lugs 52A, 52B of each brake pad 13A, 13B embrace part of the intermediate portion 15 of the caliper member 14. In practice the projecting portions 53A, 53B and the corresponding bearing surfaces of the intermediate portions 15 of the caliper member 13 are complementarily inclined to define a dovetail connection.

A single leaf spring 54 fixed by a screw 55 to the intermediate portion 15 of the caliper member 14 bears against the lugs 52A, 52B of the brake pads 13A, 13B to maintain the projecting portions 53A, 53B against the corresponding bearing surfaces on the intermediate portion 15 of the caliper member 14.

The operation of the embodiment just described with reference to FIGS. 11–14 is similar to that of the embodiment of FIGS. 1–6.

In practice the lateral flanks 58 of the intermediate portion 15 of the caliper member 14 along which the lugs 52A, 52B of the brake pads 13A, 13B bear circumferentially each comprise in their central region a slot 56 for the axial displacement of the projecting portions 53A, 53B on the lugs when the brake pads 13A, 13B are to be mounted into position or when they are disassembled should they require replacement due to wear. In the illustrated embodiment of FIGS. 11–14 the lateral flanks 58 are defined on protruding portions 57 which, as above, protrude along the lateral surfaces of the caliper member 14, interrupted by the slot 56.

FIG. 15 illustrates a modified embodiment with regard to the means employed for the rocking mounting of the caliper member 15 about an axis perpendicular to the axial gripping plane P. According to this modified embodiment rolling contact is provided between the leg member 27 of the fixed support 12 and the caliper member 14 along at least one of the wide sides 31, 31' of the leg member.

As illustrated each of the corresponding wide surfaces of the opening or passage 25 in the caliper member 14 forms rolling surface which is convex in section facing the leg member 27, in a plane parallel to the axial gripping plane P and, therefore, in practice in the plane of FIG. 15.

An opposite arrangement may be adopted, however, in which the rolling surface or race is formed by one of the wide sides 31, 31' of the leg member 27.

The present invention is, moreover, not restricted to the illustrated and described embodiments, but encompasses all modifications alternatives and expedients and combinations thereof within the purview of the appended claims.

In particular as shown in phantom lines in FIG. 11 two leg members 27 may be provided, one on each side of the axial gripping plane P, the caliper member having two lobes 26 accordingly.

In FIG. 11, also in phantom lines, are hermetic bellows 60 which may be utilized as suggested above for a protected lubricating arrangement for the guiding surfaces between the caliper member and the leg member.

In any event it is to be underscored that the median plane M of the leg member 27 is perpendicular to the axial gripping plane P containing the gripping axis A. In this arrangement the fixed member affords, in operation, good resistance to braking forces.

It is unnecessary that the leg member be of quadrilateral contour; the contour may also be circular or oval. Further, when such a quadrilateral contour is employed it does not necessarily involve the entire height of the leg member concerned; it is enough for it to cover the effective portion thereof.

What is claimed is:

1. A crown-type caliper brake comprising a single fixed support therefor, a rotatable generally cylindrical braking member, two brake pads disposed respectively inside and outside said cylindrical braking member, and a generally C-shaped caliper member mounted for radial movement with respect to said cylindrical braking member and radially straddling said brake pads and said braking member; said caliper member including a first limb, a second limb and an intermediate portion interconnecting said limbs; said first limb having force-applying means cooperable with a first of said brake pads and said second limb being cooperable with a second of said brake pads so that in response to said force-applying means and transmission of a corresponding force by said caliper member said brake pads are both applied against said braking member along a generally radial gripping axis passing through central areas of said brake pads; wherein the improvement comprises said fixed support having a single leg member extending generally parallel to the gripping axis, said caliper member having a lobe located completely to one side of said force-applying means, a guideway of closed contour extending substantially through said lobe for slidable mounting said caliper member on said leg member, said leg member having two sides lying in planes parallel to and both being spaced to said one side of an axial plane containing the gripping axis and said two sides being in sliding contact with corresponding portions of said guideway.

2. A brake as claimed in claim 1, wherein a pin or stud extending from said first limb to said second limb circumferentially blocks said brake pads.

3. A brake as claimed in claim 2, wherein said pin or stud is removably mounted on said caliper member.

4. A brake as claimed in claim 2 or 3, wherein two said pins or studs are provided, said brake pads having lugs for engagement with said pins or studs.

5. A brake as claimed in claim 1, further comprising means for circumferentially blocking each said brake pad on its associated limb of said caliper member.

6. A brake as claimed in claim 5, wherein said last-mentioned means comprises a raised portion on said first brake pad fitted in a hollow portion in said force-applying means.

7. A brake as claimed in claim 5 or 6, wherein said last-mentioned means comprises a raised portion on said second brake pad fitted in a hollow portion in said second limb.

8. A brake as claimed in claim 1, further comprising means for circumferentially blocking each said brake pad on said intermediate portion of said caliper member.

9. A brake as claimed in claim 8, wherein said last-mentioned means comprises portions on lugs of each said brake pad projecting towards each other and embracing said intermediate portion of said caliper member.

10. A brake as claimed in claim 9, wherein said projecting portions of said lugs and corresponding bearing surfaces on said intermediate portion of said caliper member are complementarily inclined to form a dovetail connection.

11. A brake as claimed in claim 10, wherein lateral flanks of said intermediate portion of said caliper member on which said corresponding bearing surfaces are formed comprise slots in their central regions for receiving said lugs.

12. A brake as claimed in claim 1, wherein said leg member has a rectangular contour, including said two sides parallel to said axial plane passing through the gripping axis and two other sides perpendicular to said axial plane passing through the gripping axis.

13. A brake as claimed in claim 12, wherein said sides of said leg member perpendicular to said axial plane containing said gripping axis define play with corresponding surfaces of said guideway in said lobe of said caliper member.

14. A brake according to claim 13, further comprising resilient means for taking up the play defined between the two sides perpendicular to said axial plane containing said gripping axis and the corresponding surfaces of said guideway in said lobe of said caliper member.

15. A brake according to claim 14, wherein said resilient means comprises a leaf spring with portions alternately bearing on said leg member and said caliper member.

16. A brake according to claim 12, wherein rolling contact is formed between one of the sides of said leg member perpendicular to said axial plane containing said gripping axis and a corresponding surface on said guideway in said lobe of said caliper member, one of said one side of said leg member and said corresponding surface of said caliper member comprising a rolling surface which is convex to the other of said one side or said corresponding surface in a plane parallel to said axial plane.

17. A brake as claimed in claim 1, wherein said fixed support comprises a generally flat member, said two sides of said leg member being edge portions of said fixed support.

18. A brake as claimed in claim 1 or 17, wherein said leg member is formed in one piece with the rest of said fixed member.

19. A brake as claimed in claim 1, wherein said fixed support is disposed substantially entirely within the confines of said braking member.

20. A brake according to claim 1, wherein said opening in said caliper member lobe is in part defined by two opposed surfaces opposing opposite faces of said leg member, and said opposed surfaces being convex and facing towards said leg member for permitting rocking of said caliper member relative to said leg member.

21. A crown-type caliper brake according to claim 1, wherein the median plane through said leg member perpendicular to said axial gripping plane containing the gripping axis also contains the gripping axis.

* * * * *